United States Patent [19]

Kojima

[11] Patent Number: 5,579,338
[45] Date of Patent: Nov. 26, 1996

[54] SPREAD SPECTRUM RECEIVER USING PARTIAL CORRELATIONS

[75] Inventor: Toshiharu Kojima, Kamakura, Japan

[73] Assignee: Mitsubishi Denki Kabushiki Kaisha, Tokyo, Japan

[21] Appl. No.: 186,819

[22] Filed: Jan. 25, 1994

Related U.S. Application Data

[63] Continuation of Ser. No. 84,310, Jun. 28, 1993, abandoned.

[30] Foreign Application Priority Data

Jun. 29, 1992 [JP] Japan .................................... 4-171318

[51] Int. Cl.$^6$ .................................................. H04B 15/00
[52] U.S. Cl. ......................... 375/208; 375/325; 375/326; 375/339; 375/343; 375/344; 375/354; 329/302; 329/306; 329/323; 329/358; 364/728.03
[58] Field of Search .................................... 375/200–210, 375/316, 344, 354, 325, 326, 339, 343; 348/536; 329/304, 306, 308, 309, 302, 323, 358; 364/728.03

[56] References Cited

U.S. PATENT DOCUMENTS

| 4,189,677 | 2/1980 | Cooper et al. | 375/1 |
|---|---|---|---|
| 4,222,115 | 9/1980 | Cooper et al. | 375/1 |
| 4,932,037 | 6/1990 | Simpson et al. | 375/1 |
| 5,127,021 | 6/1992 | Schreiber | 375/1 |
| 5,151,919 | 9/1992 | Dent | 375/1 |
| 5,218,619 | 6/1993 | Dent | 375/1 |
| 5,235,614 | 8/1993 | Bruckert et al. | 375/1 |
| 5,237,587 | 8/1993 | Schoolcraft | 375/1 |

FOREIGN PATENT DOCUMENTS

4-167723  6/1992  Japan .

OTHER PUBLICATIONS

Mutsumu Serizawa & Koji Ogura "A Carrier Frequency Offset Detection Scheme Utilizing Correlation w/a priori Known Sequence " Dec. 1992 vol. J 75–B–II No. 12 pp. 884–895.

*Primary Examiner*—Stephen Chin
*Assistant Examiner*—Amanda T. Le
*Attorney, Agent, or Firm*—Wolf, Greenfield & Sacks, P.C.

[57] ABSTRACT

A complex baseband signal as long as one period of PN signal is divided into three sequences. The three partial signals are input to three correlators which then calculate the correlations between the three partial signals and three partial PN signals. The squares of the absolute values of outputs from the three partial correlators are summed and the peak of the resultant summed signal is detected, thereby performing initial acquisition and tracking of synchronization of PN signal. Outputs from the three partial correlators are added together by an adder for generating a correlation signal used for data demodulation. Since partial correlation signals output from three partial correlators have a phase difference corresponding to a frequency offset, and error signal corresponding to the frequency offset is provided by performing complex conjugate product operations on the partial correlation signals. Thus, data demodulation, initial acquisition, synchronization tracking and error signal generation can be performed by using identical partial correlators.

9 Claims, 9 Drawing Sheets

5,579,338

SPREAD SPECTRUM RECEIVER USING PARTIAL CORRELATIONS

This application is a continuation application of Ser. No. 08/084,310, filed Jun. 28, 1993.

BACKGROUND OF THE INVENTION

1. Field of the Invention

This invention relates to an improvement in a spread spectrum receiver.

2. Description of the Prior Art

In recent years, those skilled in the art have focused on code division multiple access (CDMA) techniques using direct sequence/spread spectrum (DS/SS)signaling in a mobile communication field. To apply DS/SS communication to mobile communication, it is difficult to recover carrier, thus it is desired to make a quasi-coherent detection at a receiver.

For the quasi-coherent detection, if a local carrier has a frequency offset, the error rate characteristic degrades. Thus, an AFC (automatic frequency control) circuit is indispensable for frequency control of the local carrier or compensation of the effect of the frequency offset.

Referring to FIG. 1, the prior art is described. FIG. 1 is a block diagram showing the configuration of a conventional spread spectrum receiver. In FIG. 1, a received SS signal is quasi-coherently detected by a quasi-coherent detector and AFC circuit 100, and output as a complex baseband signal. This complex baseband signal is input to a correlator 110 which then calculates the correlation between the signal and a PN signal used for spread spectrum modulation of the received SS signal to generate a complex correlation signal. This complex correlation signal is input to an square absolute value circuit 120 which then outputs a synchronization setting signal having the square of the absolute value of the complex correlation signal. An initial acquisition and synchronization tracking circuit 130 uses the synchronization setting signal to generate a symbol clock synchronized with the period of the PN signal contained in the received SS signal and a chip clock synchronized with the chip duration of the PN signal.

On the other hand, the complex correlation signal output from the correlator 110 is also input to a demodulation processing circuit 140 which then performs demodulation processing of the signal conforming to the primary demodulation to generate demodulated data.

Next, the configuration and operation of the quasi-coherent detector and AFC circuit 100 are described. FIG. 2 is a block diagram showing the configuration of the conventional quasi-coherent detector and AFC circuit 100. In FIG. 2, a received SS signal is multiplied by a local carrier output from a voltage-controlled oscillator (VCO) 230 by a multiplier 210 and from the result, an image frequency component is removed through a low pass filter 250. Then the resultant signal is converted into digital data by an analog-to-digital (A/D) converter 270 to generate a real component of a complex baseband signal. Likewise, the received SS signal is also multiplied by a local carrier whose phase is shifted π/2 by a phase shifter 240 by a multiplier 240 and the result is passed through a low pass filter 260 and an analog-to-digital (A/D) converter 280 to generate an imaginary component of the complex baseband signal.

The complex baseband signal thus provided becomes an output signal of the quasi-coherent detector and AFC circuit 100 and is also input to an error signal generation circuit 290.

Next, the configuration and operation of the error signal generating circuit 290 are described. FIG. 3 is a block diagram showing the configuration of the conventional error signal generation circuit 290. A process in which the error signal generation circuit 290 generates an error signal is described. Assume that the primary modulation is BPSK (binary phase-shift keying), that the period of a PN signal used for spread spectrum modulation is M chips, that the chip duration is $T_c$, and that the value of the mth (m=1, ..., M) PN signal is $u_m \in \{-1, 1\}$. Also, assume that the symbol duration of data is $T_d = MT_c$, that the value of transmit data at time $nT_d$ (n is an integer) is $a_n \in \{-1, 1\}$, and that the angular frequency of a transmit carrier is $\omega_C$.

The receiver receives a SS signal having a value of $a_n u_m \cos[\omega_C (nT_d + mT_c)]$ at time $nT_d + mT_c$.

Assume that the angular frequency of a local carrier used for quasi-coherent detection is $\omega_C + \Delta\omega$ and its initial phase is $\phi$. Assume that the sampling period of A/D conversion equals the chip duration and that no quantization error exists. The value of complex baseband signal at time $nT_d + mT_c = (nM+m) T_c$, $r_{nM+m}$, is given by $$r_{nM+m} = a_n u_m \exp[-j\{\Delta\omega(nM+m) T_c + \phi\}] \tag{1-1}$$

At the error signal generation circuit 290 shown in FIG. 3, a deviation signal generation circuit 400 outputs a signal of $\exp[j\omega_0 t]$. The signal is converted by a conjugate circuit 410 into a signal of $\exp[-j\omega_0 t]$ which is a complex conjugate.

The complex baseband signal input to the error signal generation circuit 290 is multiplied by the signal $\exp[-j\omega_0 t]$ by a multiplier 420 and positive angular frequency deviation $\omega_0$ ($\omega_0 > 0$) is given, then the result is output as a "positive deviation baseband signal." The complex baseband signal is also multiplied by the signal $\exp[j\omega_0 t]$ output from the deviation signal generation circuit 400 by a multiplier 430 and negative angularfrequency deviation $-\omega_0$ is given, then the result is output as a "negative deviation baseband signal."

Assuming that the values of the positive and negative deviation baseband signals at time $(nM+m) T_c$ are $r_{pnM+m}$ and $r_{pnM+m}$ respectively, the values of $r_{pnM+m}$ and $r_{nnM+m}$ are given by $$r_{nnM+m} = a_n u_m \exp[-j\{(\Delta\omega + \omega_0) T_c + \phi\}]$$

$$r_{nnM+m} = a_n u_m \exp[-j\{(\Delta\omega - \omega_0) T_c + \phi\}] \tag{1-2}$$

The positive and negative baseband signals are input to complex correlators 440 and 450, respectively, which then calculate the correlations between the signals and PN signals to generate a "positive deviation correlation signal" and a "negative deviation correlation signal." Assuming that the values of the positive and negative deviation correlation signals corresponding to transmit data $a_n$ provided every symbol duration $T_d$ are $c_{pn}$ and $c_{nn}$ respectively, from Equation (1–2), $c_{pn}$ and $c_{nn}$ are given by $$c_{pn} = \sum_{m=1}^{M} u_m r_{pnM+m} \tag{1-3}$$

$$= a_n \exp[-j\{(\Delta\omega + \omega_0)B_n T_c/2 + \phi\}] \cdot$$

$$\sin[(\Delta\omega + \omega_0) MT_c/2]/\sin[(\Delta\omega + \omega_0)T_c/2]$$

$$c_{nn} = \sum_{m=1}^{M} u_m r_{nnM+m}$$

$$= a_n \exp[-j\{(\Delta\omega - \omega_0)B_n T_c/2 + \phi\}] \cdot$$

$$\sin[(\Delta\omega - \omega_0)MT_c/2]/\sin[(\Delta\omega - \omega_0)T_c/2]$$

$$B_n = (2n+1)M + 1$$

Further, square absolute value circuits 460 and 470 square the absolute values of the positive and negative correlation signals to generate a "positive deviation error signal" and a "negative deviation error signal." Last, the negative deviation error signal is subtracted from the positive deviation error signal by a subtractor 480 and the resultant signal is latched by a latch 490 every symbol duration $T_d$, thereby providing an error signal. That is, the error signal $e_n$ corresponding to the transmit data $a_n$ is given by $$e_n = |c_{pn}|^2 - |c_{nn}|^2 = \qquad (2-4)$$

$$\{\sin[(\Delta\omega + \omega_0)MT_c/2]/(\sin[(\Delta\omega + \omega_0)T_c/2])\}^2 -$$

$$\{\sin[(\Delta\omega - \omega_0)MT_c/2]/(\sin[(\Delta\omega - \omega_0)T_c/2])\}^2$$

By setting the value of given angular frequency deviation to the range of $0 < \omega_0 \leq 2\pi/T_d$, the error signal $e_n$ has value corresponding to angular frequency offset $\Delta\omega$. FIG. 4 shows the relationship between the error signal $e_n$ and phase rotation amount $\Delta\omega T_d$ for the symbol duration when M=127 and $\omega_0 = \pi/T_d$. From the graph, it is understood that the error signal $e_n$ is substantially proportional to the angular frequency offset $\Delta\omega$ in the range of $|\Delta\omega T_d| \leq \pi$. Thus, the error signal corresponding to the frequency offset can be provided by the error signal generation circuit 290 in FIG. 3.

Referring again to FIG. 2, the configuration and operation of the quasi-coherent detector and AFC circuit 100 are described. The error signal provided by the error signal generation circuit 290 as described above, $e_n$, is multiplied by gain $\alpha$ by a multiplier 300, then the result is integrated by an integrator 310 to improve the signal-to-noise ratio of the error signal. The output signal of the integrator 310 is converted into an analog signal by a digital-to-analog (D/A) converter 320, and the resultant voltage signal is used to control the VCO 230 which oscillates local carrier, thereby performing AFC operation so as to always set the angular frequency offset $\Delta\omega$ to 0.

Since the conventional spread spectrum receiver is configured as described above, in addition to the correlators used for PN signal synchronization and data demodulation, another correlator is required for the AFC error signal generation circuit. Thus, the configuration is prone to become complicated and miniaturization and low power consumption are not easy to accomplish.

SUMMARY OF THE INVENTION

Accordingly, it is an object of the invention to provide a spread spectrum receiver which can perform all of synchronization of PN signal, AFC, and data demodulation by using identical partial correlators, thus has a simple configuration for easily accomplishing miniaturization and low power consumption.

To the end, according to one embodiment of the invention, there is provided a spread spectrum receiver for receiving spread spectrum modulated signals, comprising:

a quasi-coherent detector for mixing a received spread spectrum (SS) signal spread spectrum modulated by pseudonoise (PN) signal with local carriers orthogonal to each other for providing a complex baseband signal;

partial correlation calculation means for dividing the complex baseband signal provided by the quasi-coherent detector into partial data sequences and calculating correlations between the partial data sequences and partial PN signals corresponding thereto for providing partial correlation signals;

means for calculating the sum of squares of absolute values of the partial correlation signals provided by the partial correlation calculation means and providing a summed square correlation signal; and initial acquisition and synchronization tracking means being responsive to the summed square correlation signal provided by the square absolute value summing means for detecting a period of the PN signal contained in the received SS signal and outputting a timing signal synchronized with the period.

Thus, a signal as long as one period of PN signal is divided into partial data sequences and the partial correlations are calculated which are the correlation signals between the signals into which the signal as long as one period of PN signal is divided and the partial PN signals into which the 1-period PN signal is divided. The partial correlation signals are summed for providing the same correlation signal as provided by a single correlator, and this signal is used for data demodulation. Also, the sum of squares of absolute values of the partial correlation signals is used for initial acquisition and tracking of synchronization of PN signal. Since the peak value of the absolute value square sum of the partial correlation signals (namely, energy sum) reduces only a little even if a frequency offset is large, the peak appearing in synchronization with the period of PN signal can be detected securely and preferred initial acquisition of synchronization of PN signal can be executed.

According to another preferred embodiment of the invention, the receiver further includes:

means for performing complex multiplication of complex conjugate signals of the partial correlation signals provided by the partial correlation calculation means and partial correlation signals shifted a predetermined period from the partial correlation signals and calculating the sum of the resultant complex conjugate product signals;

means for generating and outputting an error signal in response to the summed complex conjugate product signal output from the complex conjugate product summing means and the timing signal output from the initial acquisition and synchronization tracking means; and means for adjusting a frequency of a local carrier in response to the error signal output from the error signal generation means for correcting a frequency offset of the local carrier to a carrier of the received SS signal.

If a frequency offset exists, partial correlation signals has phase difference each other. That is, the phase difference between two adjacent partial correlation signals corresponds to the frequency offset of local carrier. Thus, a signal corresponding to the frequency offset can be generated from the complex conjugate product of the partial correlation signals and the signal can be used to correct the frequency offset.

The complex conjugate product summing means may perform complex multiplication of a complex conjugate signal of a partial correlation signal provided by one partial correlation calculation means and a partial correlation signal provided by its adjacent partial correlation calculation means.

Preferably, the error signal generation means comprises:

means for separating an imaginary part of the summed complex conjugate product signal provided by the complex conjugate product summing means; and error signal output timing control means for outputting the imaginary part of the summed complex conjugate product signal provided by the imaginary part separation means as an error signal and controlling the output timing of the error signal in response to the timing signal output from the initial acquisition and synchronization tracking means, thereby providing the error signal.

The error signal generation means may comprise:

means for extracting an argument (phase angle) of the summed complex conjugate product signal provided by the complex conjugate product summing means; and error signal output timing control means for outputting the argument of the summed complex conjugate product signal provided by the argument extraction means as an error signal and controlling the output timing of the error signal in response to the timing signal output from the initial acquisition and synchronization tracking means, thereby providing the error signal as well.

The spread spectrum receiver may further include:

means for summing partial correlation signals provided by the partial correlation calculation means;

summed correlation signal output timing control means for outputting a summed partial correlation signal provided by the partial correlation summing means as a summed correlation signal and controlling the output timing of the summed correlation signal in response to the timing signal output from the initial acquisition and synchronization tracking means; and demodulated data generation means for generating and outputting demodulated data in response to the summed correlation signal output from the summed correlation signal output timing control means.

In the configuration, all of initial acquisition and tracking of synchronization of PN signal, AFC, and data demodulation can be performed by using identical partial correlators. That is, the partial correlators can serve for all of demodulation, initial acquisition and tracking of synchronization of PN signal and AFC. Therefore, the receiver does not require any correlator dedicated to AFC, and has the extremely simple circuit configuration for easily accomplishing miniaturization and low power consumption.

Preferably, each of the error signal output timing control means and the summed correlation signal output timing control means is formed by a latch circuit which latches the signal in response to the timing signal output from the initial acquisition and synchronization tracking means.

DESCRIPTION OF THE PREFERRED EMBODIMENTS

Figure 1:
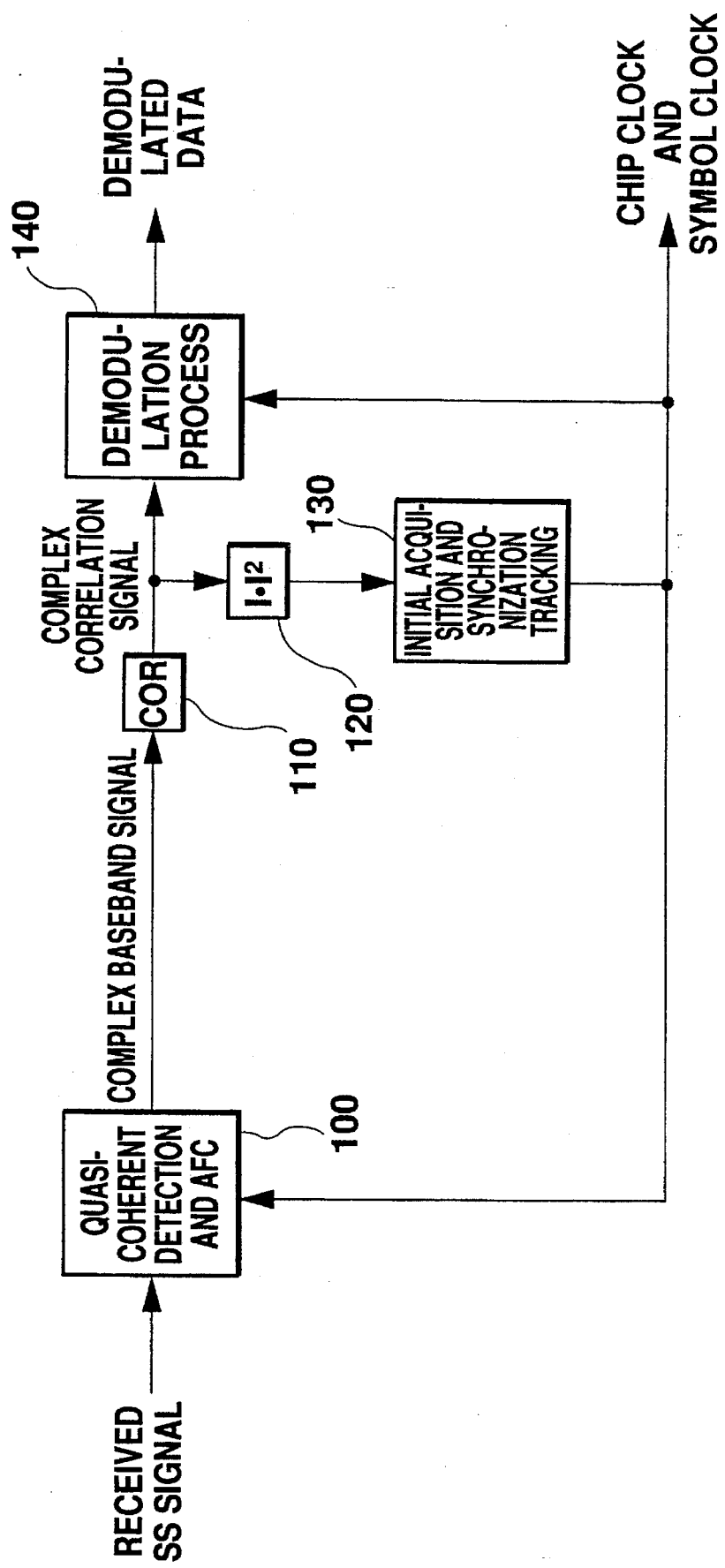
FIG. 1 is a block diagram showing the configuration of a conventional spread spectrum receiver.
Figure 2:
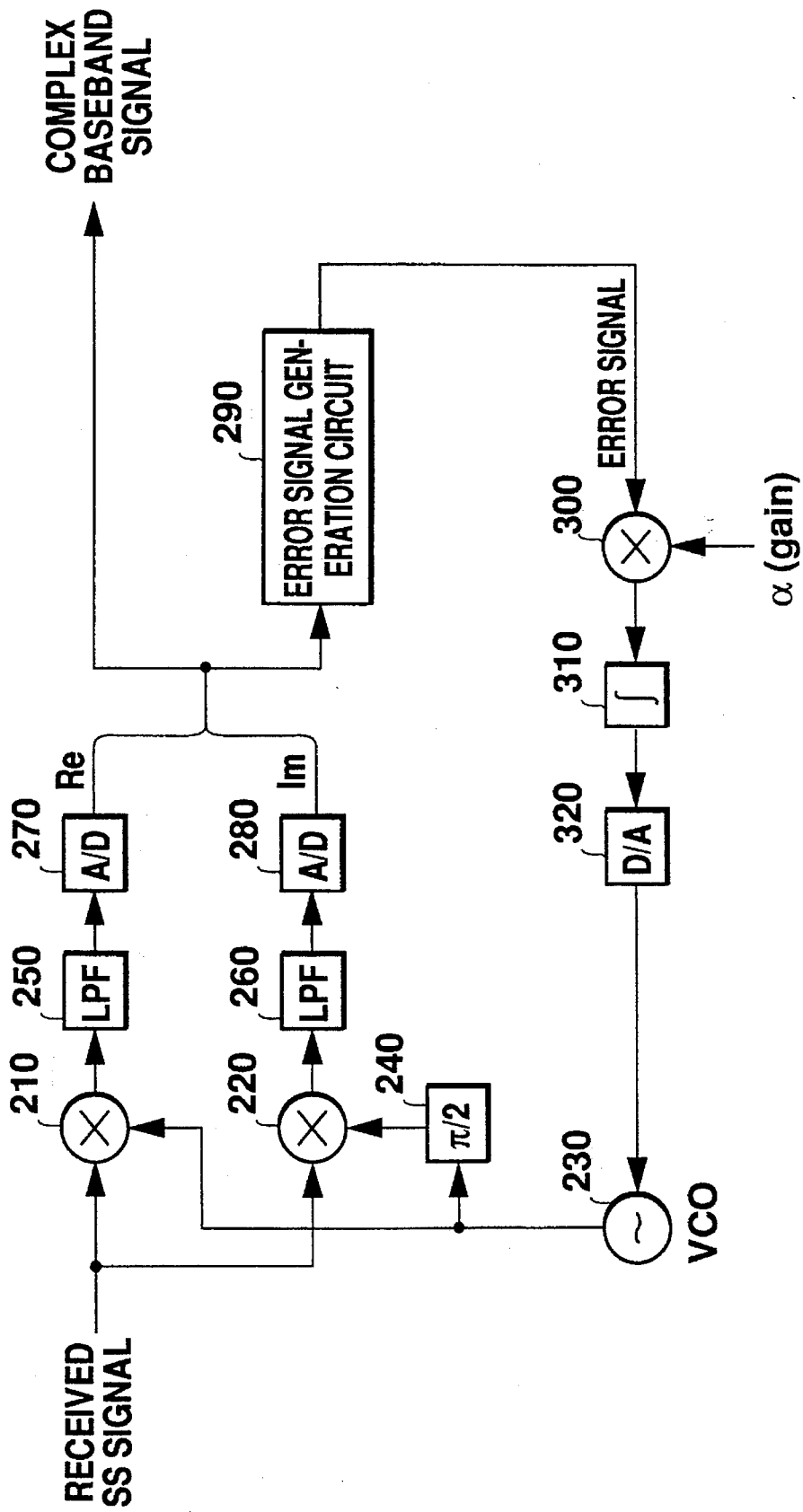
FIG. 2 is a block diagram showing the configuration of a conventional quasi-coherent detector and AFC circuit.
Figure 3:
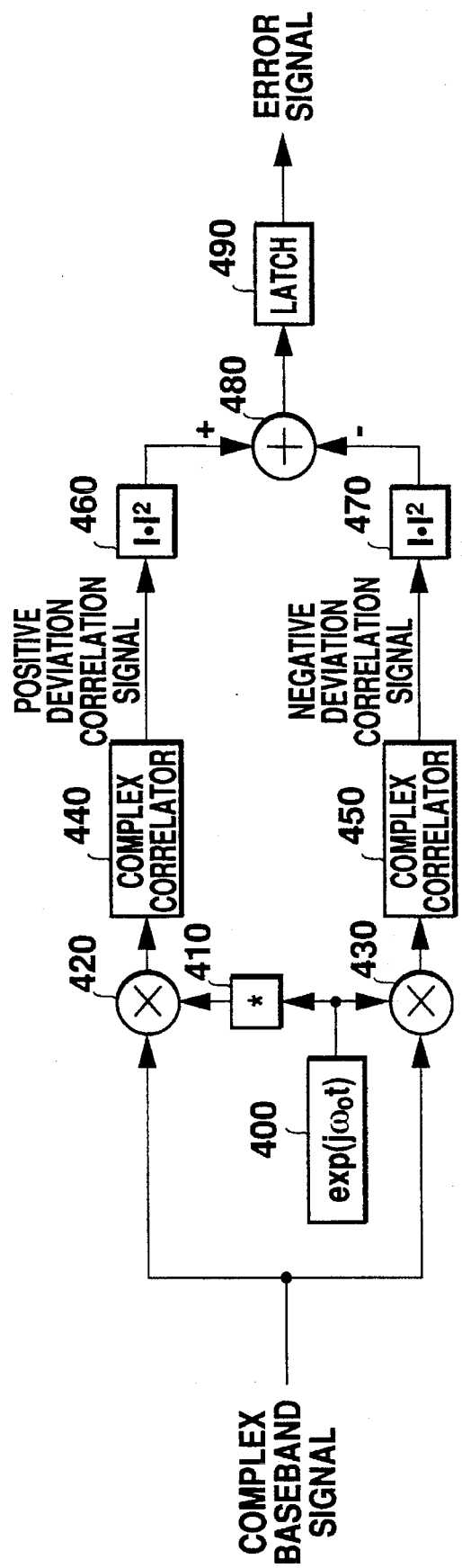
FIG. 3 is a block diagram showing the configuration of a conventional error signal generation circuit.
Figure 4:
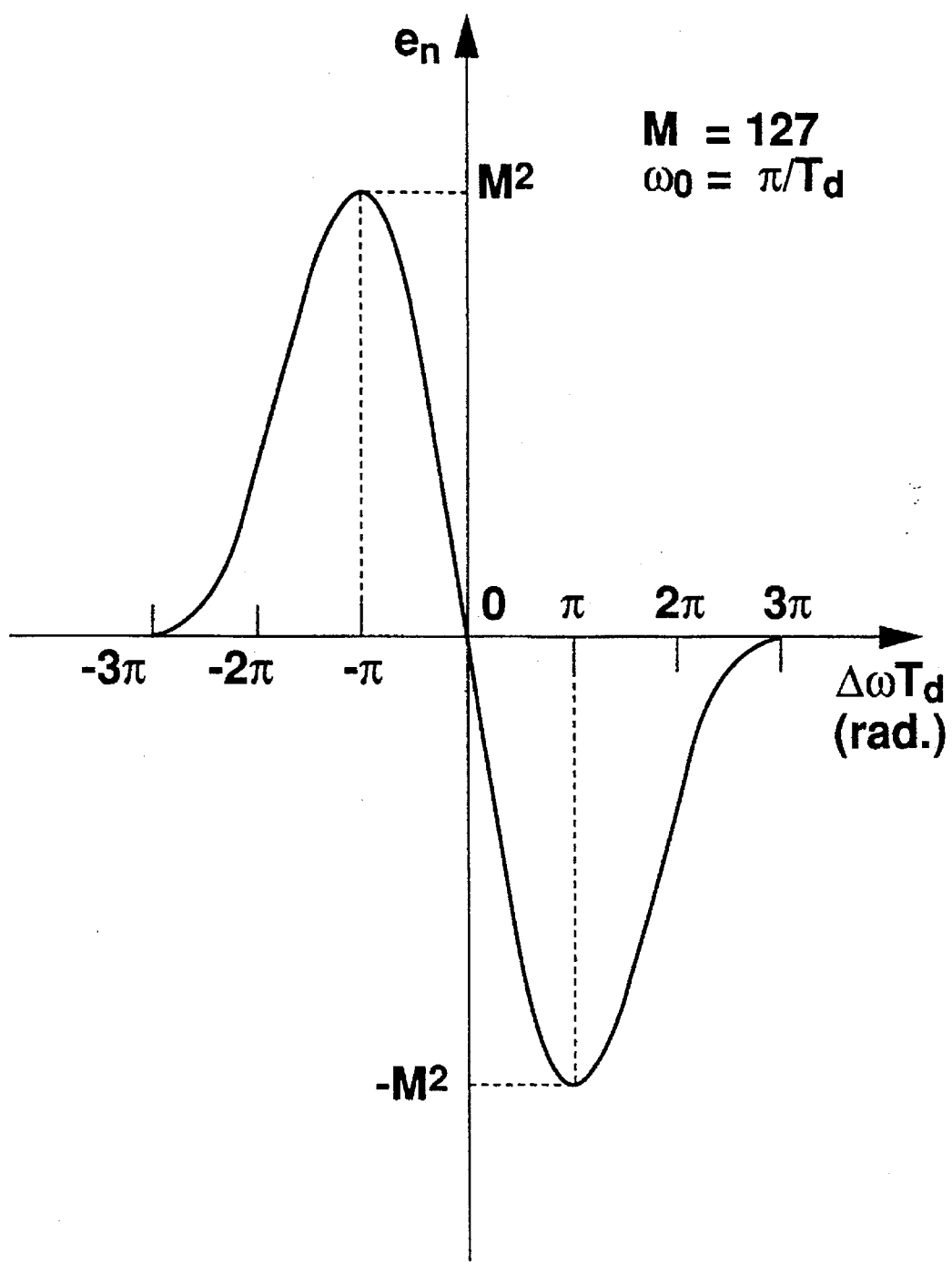
FIG. 4 is a graph showing the characteristics of a conventional error signal.
Figure 5:
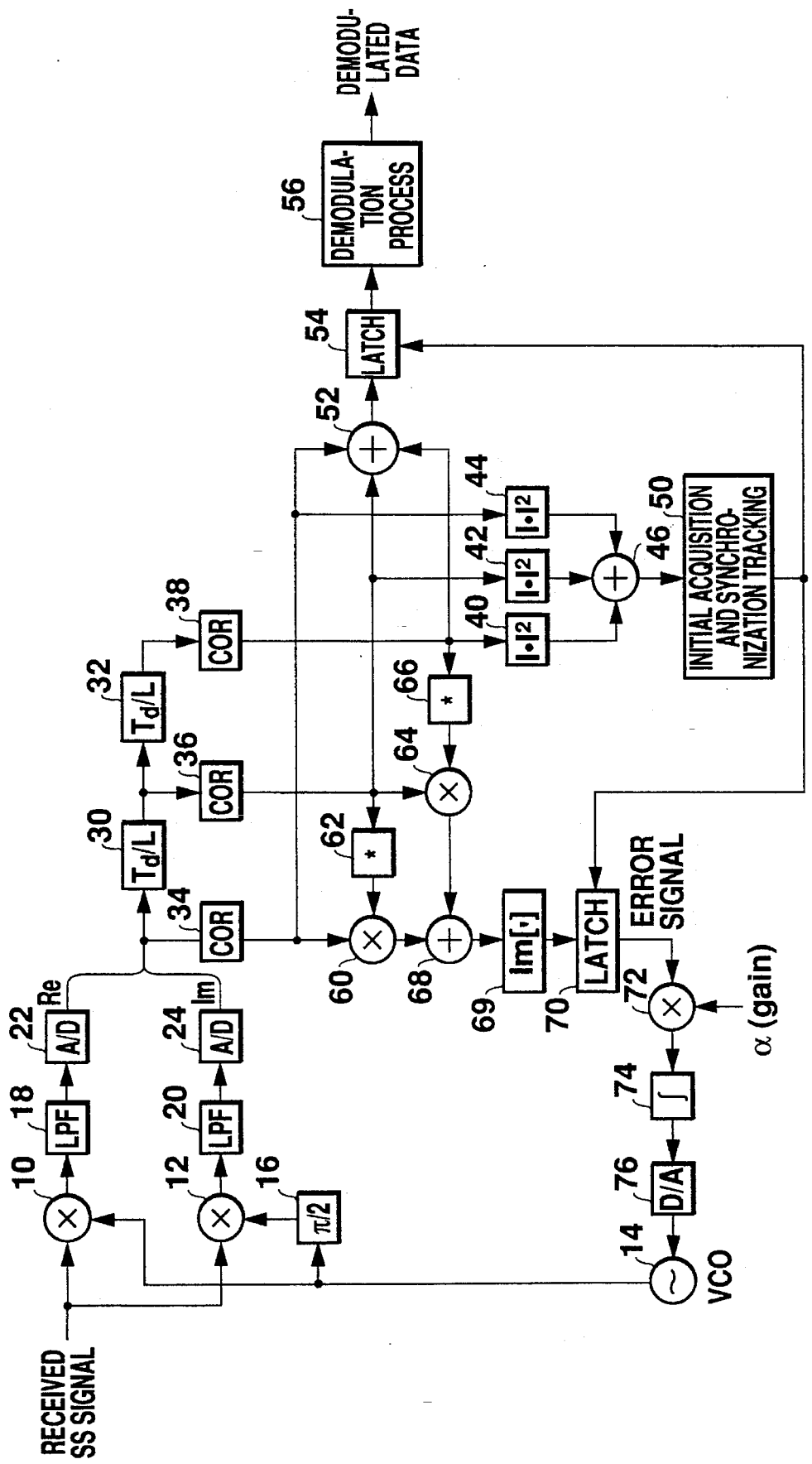
FIG. 5 is a block diagram showing the overall configuration of a spread spectrum receiver according to one embodiment of the invention.

Referring now to the accompanying drawings, there are shown preferred embodiments of the invention. FIG. 5 is a block diagram showing the configuration of a spread spectrum receiver according to one embodiment of the invention. A received SS signal which is spread spectrum modulated by PN signal is input to two multipliers 10 and 12. A local carrier from a VCO (voltage-controlled oscillator) 14 is input to the multiplier 10. Local carrier from the VCO 14 is shifted $\pi/2$ in phase by a $\pi/2$ phase shifter 16 for supplying to the multiplier 12 as a carrier. Thus, quasi-coherent detection is executed with the two local carriers orthogonal to each other. Outputs of the multipliers 10 and 12 are passed through low pass filters 18 and 20 to remove image frequency components from the multiplier outputs, then the results are converted into digital signals by analog-to-digital (A/D) converters 22 and 24. Since quasi-coherent detection is executed with the two local carriers orthogonal to each other in the processing, the signals provided by the A/D converters 22 and 24 become signals of the real part and the imaginary part of a complex baseband signal.

Next, the complex baseband signal is input to two delay circuits 30 and 32, and signals before and after the delay circuits 30 and 32 are input to three correlators 34, 36, and 38. Each of the two delay circuits 30 and 32 delays the input signal by $T_d/L$. $T_d$ is a period of PN signal which is a spread signal. L is the the number of correlators, namely, the number of partial data sequences; L=3 in the embodiment. Therefore, each of the two delay circuits delays the input signal by $T_d/3$ and continuous complex baseband signal sequences each of which having a length equal to ⅓ of the PN signal period are supplied to the correlators 34, 36, and 38 at the same time. That is, the correlators 34, 36, and 38 calculate correlation of the complex baseband signal as long as one period of PN signal divided into three sequences. A 1-period PN signal is divided into three sequences which are stored in the correlators 34, 36, and 38; the first sequence is stored in the correlator 38, the middle sequence in the correlator 36, and the last sequence in the correlator 34.

Thus, the circuit divides the complex baseband signal as long as one period of PN signal into three sequences and calculates the correlations between the three complex baseband signal sequences and the three PN signal sequences.

Outputs of the correlators 34, 36, and 38 are input to square absolute value circuits 40, 42, and 44 which then square the absolute values of the partial correlation signals. Then, the results are added together by an adder 46 for generating a summed square correlation signal. Thus, the adder 46 outputs a sum of energy of the partial correlation signals which are the correlation signals between the three signals into which the complex baseband signal as long as one period of PN signal is divided and the three signals into which the 1-period PN signal is divided. The output of the adder 46 is input to an initial acquisition and synchronization tracking circuit 50 which then detects the peak of the input signal and generates a symbol clock synchronized with the PN signal period (i.e. symbol duration). That is, since the peak of the signal output from the adder 46 appears in synchronization with the PN signal period, initial acquisition of synchronization of the PN signal can be executed by detecting the peak. After initial acquisition is accomplished, synchronization tracking operation is started, generating a symbol clock always tracking the PN signal.

Figure 6:
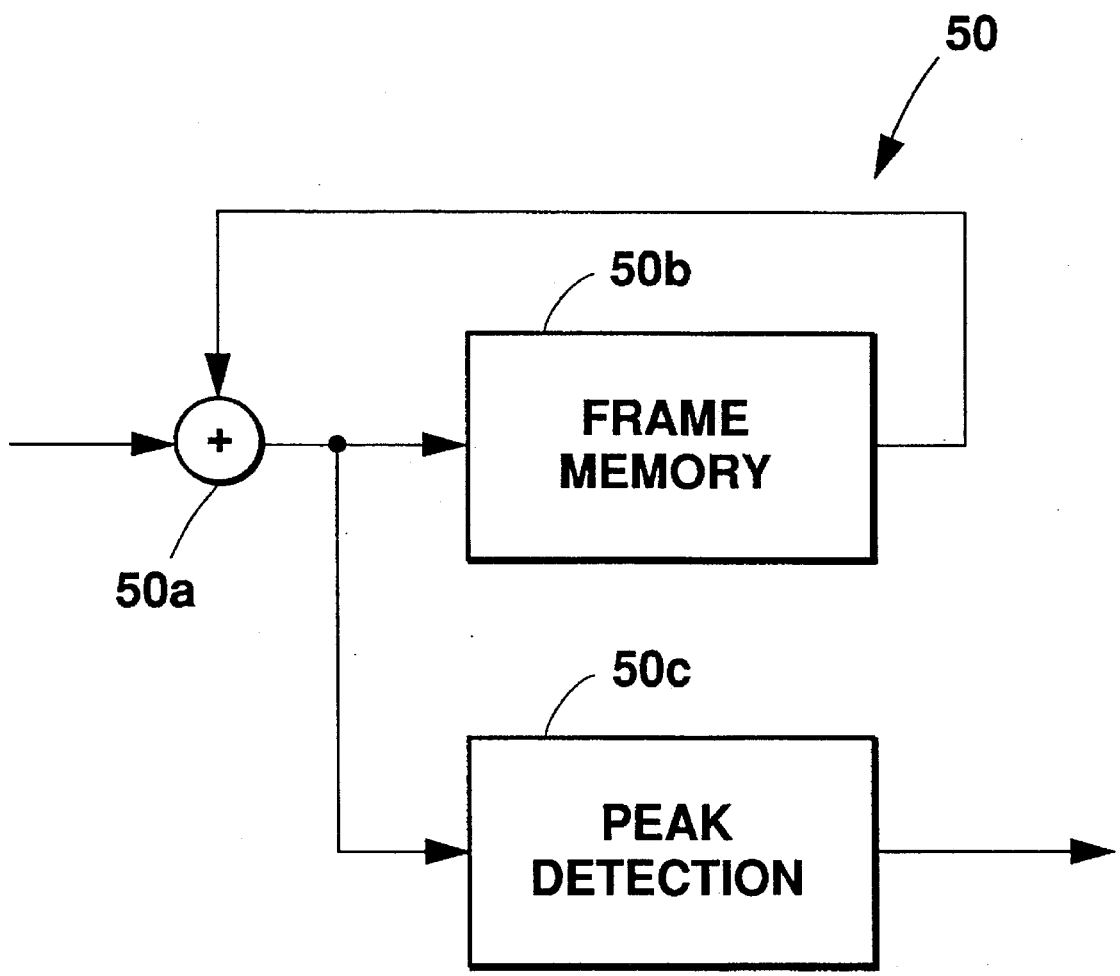
FIG. 6 is a block diagram showing a configuration example of an initial acquisition section of an initial acquisition and synchronization tracking circuit.

FIG. 6 shows a configuration example of an initial acquisition section of the initial acquisition and synchronization tracking circuit 50. As shown here, the initial acquisition section consists of an adder 50a, a frame memory 50b, and a peak detector 50c. The peak detector 50c detects the peak of an input signal, thereby detecting synchronization of PN signal (symbol duration). Since an output of the frame memory 50b which memorizes the output of the adder 50a as long as the period of the PN signal is fed back into the adder 50a, recursive integration with the period of the PN signal is performed by the adder 50a and signal-to-noise ratio of the output of the adder 50a is improved.

On the other hand, outputs of the correlators 34, 36, and 38 are input to an adder 52 which then adds them together. Thus, the three partial correlation signals are added together to generate a signal equivalent to the correlation signal calculated with 1-period PN signal. The output signal from the adder 52 is input to a latch circuit 54 which then latches it in response to a symbol clock from the initial acquisition and synchronization tracking circuit 50. That is, the correlation signal is latched at the highest point of energy and a despread signal is output from the latch circuit 54.

The output signal of the latch circuit 54 is input to a demodulation processing circuit 56 which then performs demodulation processing corresponding to the primary modulation, such as QPSK (quaternery phase-shift keying) modulation, to provide demodulated data.

On the other hand, output of the correlator 34 is input to a multiplier 60. Output of the correlator 36 is also input to the multiplier 60 through a conjugate circuit 62 which outputs a complex conjugate, and the two input signals are multiplied together. Output of the correlator 36 is also input to a multiplier 64. Output of the correlator 38 is also input to the multiplier 64 through a conjugate circuit 66, and the two input signals are multiplied together. The multipliers 60 and 64 and the conjugate circuit 62 and 66 perform complex conjugate product operations on the correlation signals from the adjacent correlators.

Outputs of the multipliers 60 and 64 are input to an adder 66 which then adds them together. The result is input to an imaginary part selector 69. The output signal of the imaginary part selector 69 is input to a latch circuit 70 which then latches the signal in response to a symbol clock to provide an error signal $e_n$.

The error signal $e_n$ is multiplied by a predetermined gain $\alpha$ by a multiplier 72. The result is integrated by an integrator 74 for averaging. The output signal of the integrator 74 is input to a D/A converter 76 which then converts the signal into an analog voltage signal which is supplied to the VCO 14. Since the VCO 14 corrects oscillation frequency in response to the error signal $e_n$, the frequency offset of the local carrier to the received SS signal is eliminated. The spread spectrum receiver according to the embodiment of the invention uses identical partial correlators for all of initial acquisition and tracking of synchronization of PN signals, AFC, and data demodulation. Therefore, the circuit configuration is extremely simple and miniaturization and low power consumption are easy to accomplish.

Here, the correlation signals provided by the partial correlators 34, 36, and 38 are described. Assume that the primary modulation is BPSK (binary phase-shift keying), that the period of the PN signal used for spread spectrum modulation is M chips, that the chip duration is $T_c$, and that the value of the mth (m=1, ..., M) PN signal is $u_m \in \{-1,1\}$. Also, assume that the symbol duration of data is $T_d = MT_c$, that the value of transmit data at time $nT_d$ (n is an integer) is $a_n \in \{-1, 1\}$, and that the angular frequency of a transmit carrier is $\omega_c$.

The receiver receives a SS signal having a value of $a_n u_m \cos[\omega_c(nT_d+mT_c)]$ at time $nT_d+mT_c$ and performs quasi-coherent detection and A/D conversion to provide a complex baseband signal. Assume that sampling period of the A/D converter equals the chip duration and that no quantization error exists.

Now, assuming that the angular frequency of a local carrier used for the quasi-coherent detection is $\omega_c+\Delta\omega$ and that its initial phase is $\phi$, the value of complex baseband signal at time $nT_d+mT_c=(nM+m)T_c$, $r_{nM+m}$, is given by $$r_{nM+m} = a_n u_m \exp[-j\{\Delta\omega(nM+m)T_c+\phi\}] \quad (2\text{-}1)$$

At a conventional DS/SS receiver, the complex baseband signal is input to a complex correlator for calculating the correlation between the complex spare band signal and 1-period PN signal to provide a correlation signal. Then the value of the correlation signal corresponding to transmit data $a_n$, $c_n$, is given by $$\begin{aligned} c_n &= \sum_{m=1}^{M} u_m r_{nM+m} \quad (2\text{-}2) \\ &= a_n \exp[-j(\Delta\omega B_n T_c/2 + \phi)] \cdot \\ &\quad \sin[\Delta\omega MT_c/2]/\sin[\Delta\omega T_c/2] \\ B_n &= (2n+1)M + 1 \end{aligned}$$

Therefore, the energy of the correlation signal, E, is given by $$\begin{aligned} E &= |c_n|^2 \quad (2\text{-}3) \\ &= \{\sin[\Delta\omega MT_c/2]\}^2/\{\sin[\Delta\omega T_c/2]\}^2 \end{aligned}$$

That is, the energy of the correlation signal provided by the single correlator decreases with the angular frequency offset $\Delta\omega$.

On the other hand, if the correlator is divided into L equal parts (L is a measure of M), the value of a partial correlation signal output from the kth (k=1, ..., L) correlator, $c_{nk}$, is given by $$\begin{aligned} c_{nk} &= \sum_{m=(k-1)M/L+1}^{kM/L} u_m r_{nM+m} \quad (2\text{-}4) \\ &= a_n \exp[-j(\Delta\omega B_{nk} T_c/2 + \phi)] \cdot \\ &\quad \sin[\Delta\omega MT_c/(2L)]/\sin[\Delta\omega T_c/2] \\ B_{nk} &= \{2n+(2k-1)/L\}M + 1 \end{aligned}$$

and, clearly, $$c_n = \sum_{k=1}^{L} c_{nk}$$

That is, the sum of the partial correlation signals output from the partial correlators equals the correlation signal output from the single correlator. Therefore, in FIG. 5 in which the number of the partial correlator L=3, the output of the adder 52 is equal to the correlation signal output from the single correlator.

On the other hand, total energy of the correlation signals provided by the partial correlators, $E_T$, is given by $$E_T = \sum_{k=1}^{L} |c_{nk}|^2 \qquad (2-6)$$
$$= L\{\sin[\Delta\omega M T_c/(2L)]\}^2/\{\sin[\Delta\omega T_c/2]\}^2$$

Comparison of Equations (2–3) and (2–6) shows that the effect of angular frequency offset when L partial correlators are used becomes 1/L times that when a single correlator is used.

Figure 7:
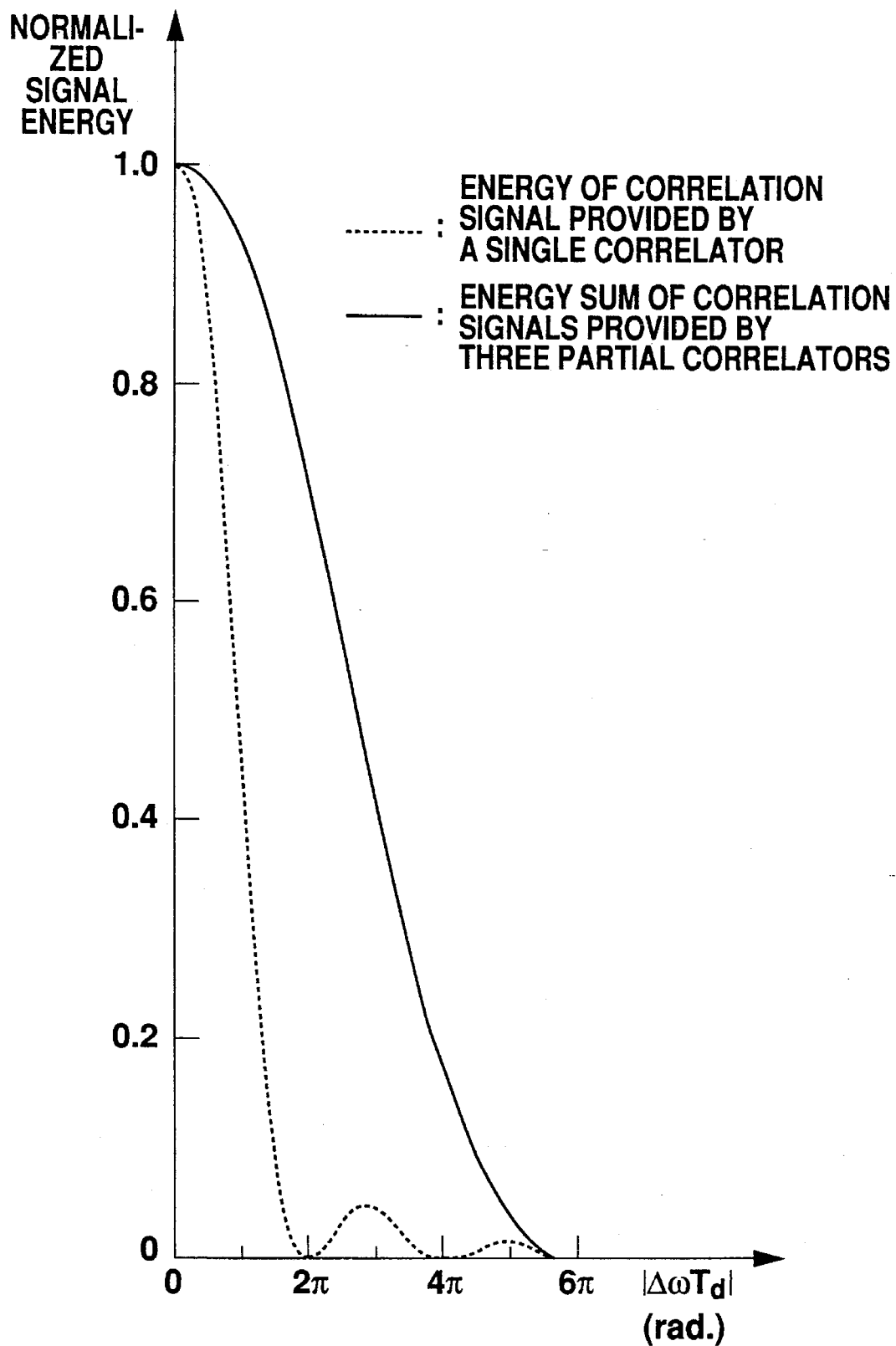
FIG. 7 is a graph showing frequency offset characteristics of correlation signal energy.

FIG. 7 shows a graph of correlation signal energy provided by a single correlator and that by three partial correlators normalized by the value at $\Delta\omega=0$ when M=63. As seen in the graph, if $|\Delta\omega|=2\pi/T_d$ where output becomes 0 when the single correlator is used, an energy loss can be reduced by using the three partial correlators.

Therefore, initial acquisition is enabled by using the sum of the squares of the absolute values of the partial correlation signals provided by the partial correlators even if a frequency offset is large where it is made difficult to execute initial acquisition of PN signal with a large energy loss if the single correlator is used.

In FIG. 5 in which the number of the partial correlators L=3, partial correlation signals are provided by the correlators 34, 36, and 38, and the sum of squares of absolute values of the partial correlation signals is calculated by the square absolute value circuits 40, 42, and 44 and the adder 46, thereby providing the signal shown in Equation (2–6). Then, using this signal, initial acquisition and tracking of synchronization of PN signal are performed by the initial acquisition and synchronization tracking circuit 50 to generate a symbol clock. In synchronization with the symbol clock, summed correlation signal the output of the adder 52 is latched by the latch 54 to generate a despread signal of the received SS signal.

As described above, by using partial correlators, in addition to normal data demodulation, initial acquisition and tracking of synchronization of PN signal can be made even if a frequency offset is large.

Next, the generation method of an error signal corresponding to a frequency offset by using partial correlators in the embodiment is described.

Expression (2–4) shows that the phase difference between partial correlation signals output from two adjacent correlators of L partial correlators is $\Delta\omega M T_c/L$. Therefore, the amount of frequency offset can be estimated by detecting the phase difference.

The principle of differential detection can be applied to detection of the phase difference between partial correlation signals. That is, the complex conjugate of an output of the (k−1)th (k=2, . . . , L) correlator is multiplied by an output of the kth correlator. Then the value of the multiplication result, $z_{nk}$, is given by $$z_{nk} = c_{nk} c_{nk-1}^* \qquad (3-1)$$
$$= \exp[-j\Delta\omega M T_c/L]\{\sin[\Delta\omega M T_c/(2L)]\}^2 / \{\sin[\Delta\omega T_c/2]\}^2$$

where * denotes the complex conjugate. The (L−1) multiplication results $z_{nk}$ are output at the same time for each data of one symbol. In FIG. 5 in which the number of partial correlators L=3, the multipliers 60 and 64 output two multiplication results $z_{n2}$ and $z_{n3}$. To improve the signal-to-noise ratio of an error signal, all the multiplication results are added together by the adder 68.

Then the value of the summed signal output by the adder 68, Z, is given by $$Z = \sum_{k=2}^{L} z_{nk} \qquad (3-2)$$
$$= (L-1)\exp[-j\Delta\omega M T_c/L] \cdot$$
$$\{\sin[\Delta\omega M T_c/(2L)]\}^2/\{\sin[\Delta\omega T_c/2]\}^2$$

Then, the imaginary part separation circuit 69 outputs the imaginary part of the summed signal Z as an error signal. That is, the value of the error signal, $e_n$, is given by $$e_n = -(L-1)\sin[\Delta\omega M T_c/L] \cdot \qquad (3-3)$$
$$\{\sin[\Delta\omega M T_c/(2L)]\}^2/\{\sin[\Delta\omega T_c/2]\}^2$$

Figure 8:
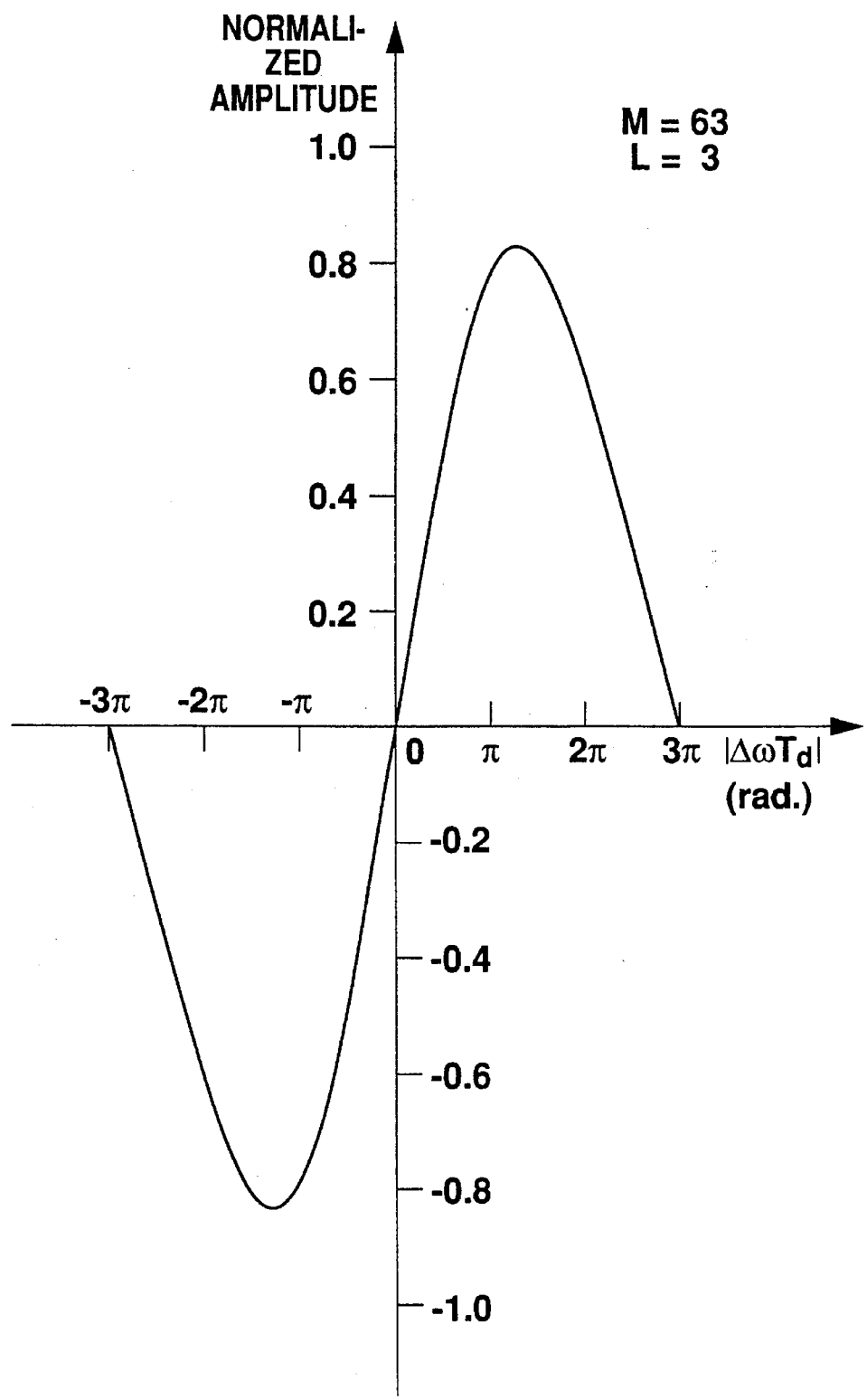
FIG. 8 is a Graph showing characteristics of an error signal Generated from partial correlators.

FIG. 8 shows a graph of the error signal normalized by L (L−1)/M when M=63 and L=3. As seen in the graph, the error signal corresponding to the angular frequency offset value can be provided by the signal processing described above.

Since the error signal $e_n$ is provided every symbol duration $T_d$ (i.e. the period of the PN signals), the output of the imaginary part separation circuit 69 is latched by the latch circuit 70 at the symbol timing to provide the error signal.

Although in the embodiment the number of the partial correlators L=3, L may be any integer of 2 or more. Although the embodiment uses the BPSK modulation as the primary modulation, any other modulation, such as QPSK, may be used.

The sampling period of A/D converters may also be 1/N (N is an integer) of the chip duration.

Figure 9:
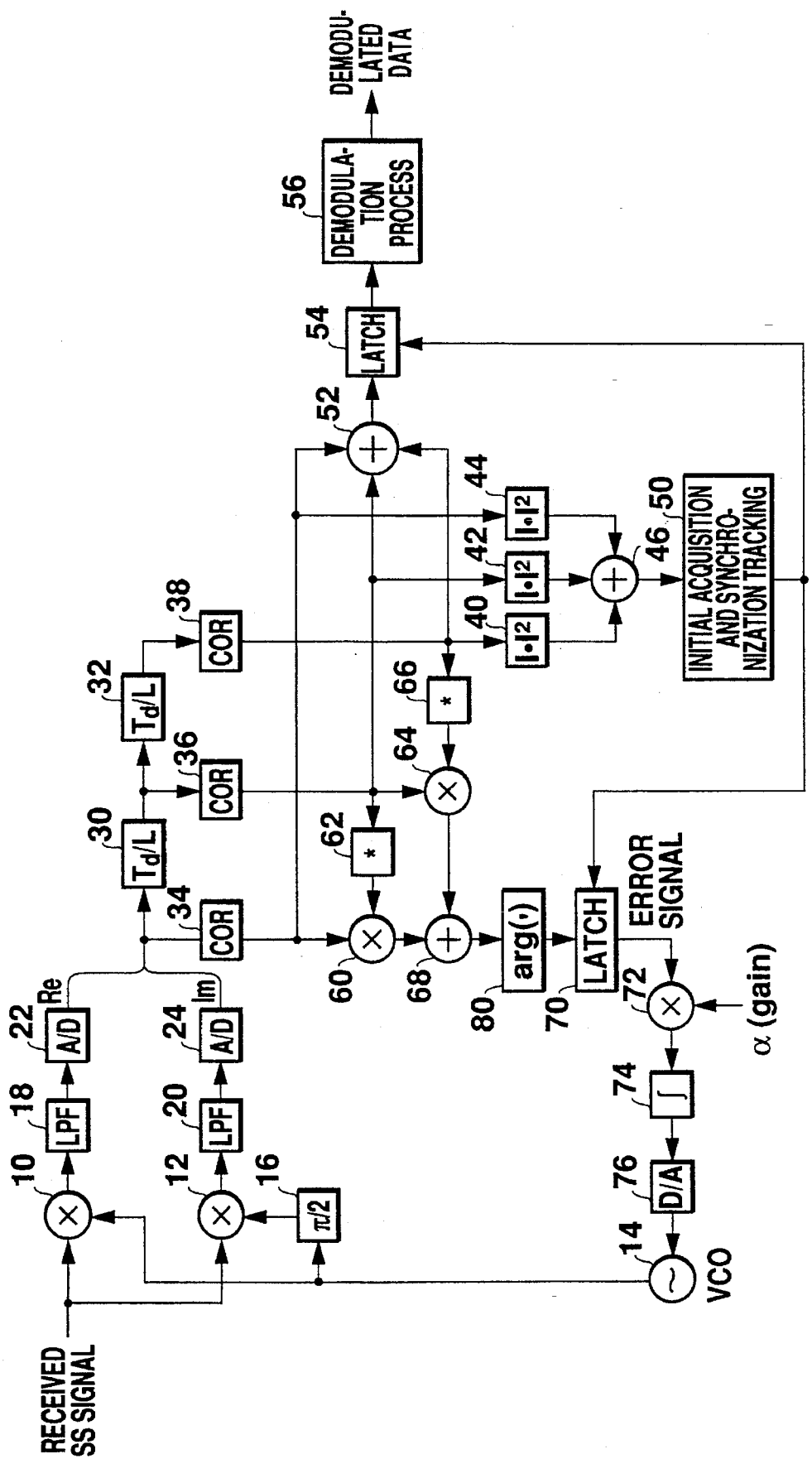
FIG. 9 is a block diagram showing the overall configuration of a spread spectrum receiver according to another embodiment of the invention.

A similar effect can also be provided by using the phase angle of the summed signal Z as the error signal. FIG. 9 shows an example of the configuration of another embodiment when the number of the partial correlators is 3. In FIG. 9, a phase angle detector 80 is adopted in place of the imaginary part separation circuit 69 in FIG. 5. The phase angle detector 80 extracts and outputs the argument (namely, phase angle) of the summed signal Z. Therefore, the output value of the phase angle detector 80 is $$\arg Z = -\Delta\omega M T_c/L$$

Since the error signal corresponding to the value of angular frequency offset $\Delta\omega$ can also be provided by the configuration in FIG. 9, a similar effect to the configuration in FIG. 5 can be provided.

The spread spectrum receiver according to the invention uses identical partial correlators for all of initial acquisition and tracking of synchronization of PN signals, AFC, and data demodulation. Therefore, the circuit configuration is extremely simple and miniaturization and low power consumption are easy to accomplish.

Particularly, the squares of the absolute values of the correlation signals output from the partial correlators are summed and the resultant summed signal is used for initial acquisition and tracking of sychronization of PN signal, thereby performing stable synchronization even if a large frequency offset exists.

When synchronization of PN signal is established and the symbol timing is acquired, AFC can operate. The complex conjugate of an output of the (k−1)th (k=2, . . . , L) correlator is multiplied by an output of the kth correlator and the (L−1) multiplication results are summed. The imaginary part (or phase angle) of the resultant summed signal is latched at the correct symbol timing provided by the initial acquisition and synchronization tracking circuit, thereby providing an error signal corresponding to the angular frequency offset. The error signal is multiplied by a predetermined gain and the result is integrated and the resultant signal is used to control the VCO which oscillates local carriers, thereby providing the AFC function.

When synchronization of PN signal is established and the angular frequency offset is eliminated by the AFC through the routine described above, data demodulation is enabled. Data demodulation can be executed by using the sum of the partial correlation signals. The outputs of the partial correlators is summed and the signal provided by latching the summed signal at the correct symbol timing is used for data demodulation.

What is claimed is:

1. A spread spectrum receiver for receiving spread spectrum signals, comprising:

a quasi-coherent detection circuit for mixing a receive spread spectrum (SS) signal spread spectrum modulated by pseudonoise (PN) signal with local carriers orthogonal to each other for providing a complex baseband signal;

partial correlation calculation means for dividing the complex baseband signal provided by said quasi-coherent detection circuit into partial data sequences and calculating correlations between the partial data sequences and partial PN signals corresponding thereto for providing partial correlation signals;

means for calculating the sum of squares of absolute values of the partial correlation signals provided by said partial correlation calculation means and providing a summed square correlation signal; and initial acquisition and synchronization tracking means being responsive to said summed square correlation signal for detecting a period of the PN signal contained in the received SS signal and outputting a timing signal synchronized with the period of the PN signal.

2. The spread spectrum receiver as claimed in claim 1 further including:

means for performing complex multiplication of complex conjugate signals of the partial correlation signals provided by said partial correlation calculation means and partial correlation signals shifted a predetermined period from the partial correlation signals and for calculating a sum of the resultant complex conjugate product signals, said sum being a summed complex conjugate product signal;

means for generating and outputting an error signal in response to the summed complex conjugate product signal output from said means for performing complex multiplication and in response to the timing signal output from said initial acquisition and synchronization tracking means; and means for adjusting a frequency of said local carriers in response to the error signal output from said means for generating and outputting an error signal for correcting a frequency offset of said local carriers to a carrier of said received SS signal.

3. The spread spectrum receiver as claimed in claim 2 wherein said means for performing complex multiplication performs complex multiplication of a complex conjugate signal of a partial correlation signal and an adjacent partial correlation signal provided by said partial correlation calculation means.

4. The spread spectrum receiver as claimed in claim 2 wherein said means for generating and outputting an error signal comprises:

means for separating an imaginary part of the summed complex conjugate product signal provided by said means for performing complex multiplication; and error signal output timing control means for outputting the imaginary part of the summed complex conjugate product signal provided by said means for separating an imaginary part as said error signal and controlling the output timing in response to said timing signal output from said initial acquisition and synchronization tracking means.

5. The spread spectrum receiver as claimed in claim 4 wherein said error signal output timing control means is a latch circuit which latches said imaginary part of the summed complex conjugate product signal in response to the timing signal output from said initial acquisition and synchronization tracking means.

6. The spread spectrum receiver as claimed in claim 2 wherein said means for generating and outputting an error signal comprises:

means for extracting an argument (phase angle) of the summed complex conjugate product signal provided by said means for performing complex multiplication; and error signal output timing control means for outputting the argument of the summed complex conjugate product signal provided by said means for extracting an argument as said error signal and controlling the output timing in response to said timing signal output from said initial acquisition and synchronization tracking means.

7. The spread spectrum receiver as claimed in claim 6 wherein said error signal output timing control means is a latch circuit which latches said argument of the summed complex conjugate product signal in response to the timing signal output from said initial acquisition and synchronization tracking means.

8. The spread spectrum receiver as claimed in claim 2 further including:

means for summing partial correlation signals provided by said partial correlation calculation means;

summed correlation signal output timing control means for outputting a summed partial correlation signal provided by said means for summing partial correlation signals as a summed correlation signal and controlling the output timing in response to said timing signal output from said initial acquisition and synchronization tracking means; and demodulated data generation means for generating and outputting demodulated data in response to the summed correlation signal output from said summed correlation signal output timing control means.

9. The spread spectrum receiver as claimed in claim 8 wherein said summed correlation signal output timing control means is a latch circuit which latches the summed partial correlation signal in response to the timing signal output from said initial acquisition and synchronization tracking means.

* * * * *